United States Patent
Nemoto et al.

[11] 3,741,572
[45] June 26, 1973

[54] QUILL SPINDLE

[75] Inventors: Kenji Nemoto, Tokyo; Fumihiro Ozawa, Matsudo, both of Japan

[73] Assignee: Seiko Seiki Kabushiki Kaisha, Tokyo, Japan

[22] Filed: Dec. 22, 1971

[21] Appl. No.: 210,900

[30] Foreign Application Priority Data
Dec. 26, 1970 Japan.............................. 45/118920

[52] U.S. Cl. ................................................ 279/50
[51] Int. Cl........................ B23b 31/20, B23b 31/26
[58] Field of Search ..................... 279/50, 47, 48, 23

[56] References Cited
UNITED STATES PATENTS
2,730,371  1/1956  Pulman................................ 279/50
3,176,553  4/1965  Schubert.............................. 279/50

Primary Examiner—Francis S. Husar
Attorney—Robert E. Burns et al.

[57] ABSTRACT

A quill spindle having a chuck, a pair of springs producing a resultant force on a pair of internal sleeves for urging the chuck into a chucking position, and an internally slideable coupling device, operable by an external device, for sliding one of the sleeves against the force of one of the springs to permit the other spring to automatically slide the other sleeve away from the chuck to remove the chucking force. A cap nut is connected to the forward end of the spindle to provide a stop for the chuck, and a flange is provided on the front of the spindle for circumferentially encompassing the cap nut to maintain the cap nut in accurate alignment. The coupling device includes a sleeve disposed within the quill for sliding movement in response to a force generated by the external device, for actuating a ball and eccentric socket mechanism coupled to one of the internal sleeves.

13 Claims, 6 Drawing Figures

QUILL SPINDLE

BACKGROUND OF THE INVENTION

The present invention relates to a quill type spindle used for a machine tool. Conventional spindle devices are ineffective for engaging and disengaging a workpiece by opening and closing a chuck mounted in the spindle during rotational operation of the device at a high velocity. A development of a quill type spindle having such construction has been required widely for the recent improvement in high-performance and high velocity operation of such machinery. The present invention provides a quill type spindle which can precisely open and close a chuck even during rotation at more than 20,000 rpm. Furthermore, while the present invention permits the operation of an automatic lathe for handling elongated bar stock at very high rotational speeds, the invention is not meant to be limited in its application to automatic lathes, and it may be adapted to a wide variety of machine tools as a spindle for tool and work stock, in that it provides a device which can be operated conveniently and effectively while holding the work-piece in a precise alignment.

SUMMARY OF THE INVENTION

Disclosed herein is a quill spindle including a quill type housing hereafter referred to as a "quill," a spindle supported for rotation within the quill, a chuck held in a forward opening in the spindle, a chuck actuating sleeve device slideably received within the quill and encompassing an intermediate portion of the spindle, a device projecting through a side wall of the quill for effecting axial sliding movement of the chuck actuating sleeve, and a sliding sleeve mechanism disposed within the spindle for forward sliding movement to actuate the chuck, and for rearward movement to deactuate the chuck in response to sliding movement of the chuck actuating sleeve device. The sliding sleeve mechanism includes a forwardly disposed sleeve encompassing the chuck for actuating the chuck as by compressing a conical slotted head thereof in a known manner, and a rearward sleeve adjacent thereto and having a plurality of tapered openings. A first coil spring is received in the chuck and bears against the forward sleeve to urge the latter slideably away from its chuck actuating position, and a second coil spring is received in the rearward sleeve and bears against a shoulder of the spindle to urge the rearward sleeve toward the forward sleeve. The second spring has a greater spring constant than the first, so that the chuck is normally actuated.

The spindle has a plurality of through holes radially aligned with the tapered openings in the rearward sleeve, and each spindle opening houses a steel ball for being forced radially inwardly by the chuck actuating sleeve device to press against the tapered side walls of the sleeve openings for moving the rearward sleeve against the force of the second spring, thereby permitting the automatic deactuation of the chuck since the forward sleeve is moved rearwardly under the force of the first spring. The chuck actuating sleeve device may comprise an outer sleeve threadably connected to the quill and having a series of gear teeth for engagement by a gear wheel extending through the quill wall for external operation, whereby rotation of the gear wheel causes rotation and resultant axial movement of the outer sleeve due to its thread-connection to the quill; and, an inner sleeve disposed coaxially within the outer sleeve and housing a ball bearing device connected internally between the inner and outer sleeves. The inner sleeve has an inclined inner peripheral surface for engaging the steel balls which extend radially outward of the spindle holes, so that sliding movement of the outer sleeve, and the accompanying sliding movement of the inner sleeve, causes the inclined surface to push the balls radially toward the rearward sleeve, or to release the balls for radially outward movement depending on the direction of sliding movement of the inclined surface of the inner sleeve.

Furthermore, the forward end of the spindle has a cap nut secured thereto for providing a forward stop for the chuck, thereby permitting its contraction, and a flange is provided to circumferentially encompass the cap nut to maintain the latter is an accurately aligned position.

BRIEF DESCRIPTION OF THE DRAWINGS

The accompanying drawings illustrate a preferred embodiment of the invention. In such drawings.

DETAILED DESCRIPTION OF THE INVENTION

As discussed above, there is no known quill type spindle having an engageable and disengageable chuck construction for operation during its high speed rotation. In order to point out the limitations of the prior art, and thus to clarify the principles of the present invention, the following description refers first to conventional spindle devices designed for actuating and deactuating a chuck during rotation of the spindle.

Figures 4, 5:
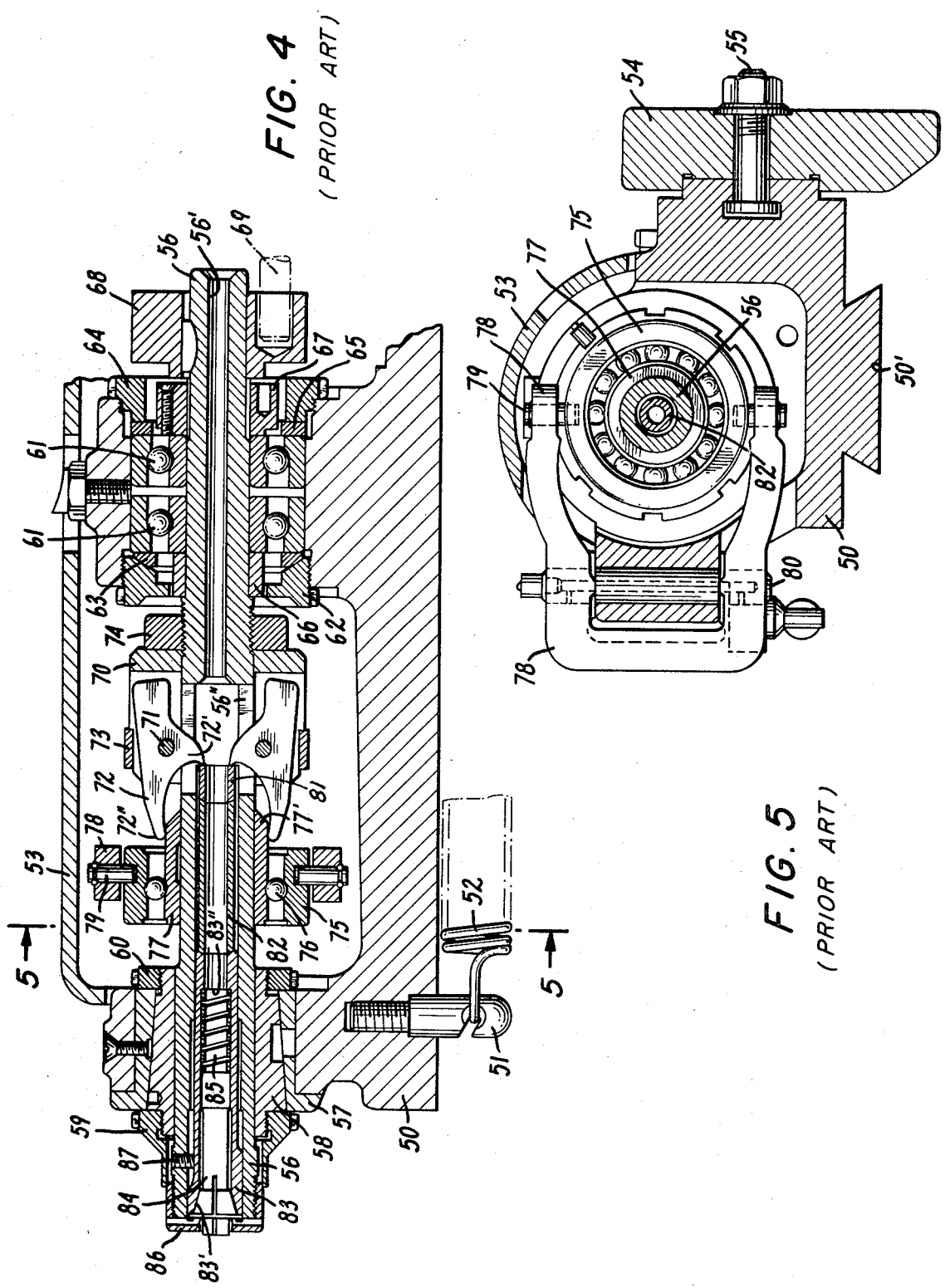
FIG. 4 is a fragmentary longitudinal section view along the axis of a work spindle for an automatic lathe known in the art.
FIG. 5 is a sectional view taken on line V—V of FIG. 4.
Figure 6:
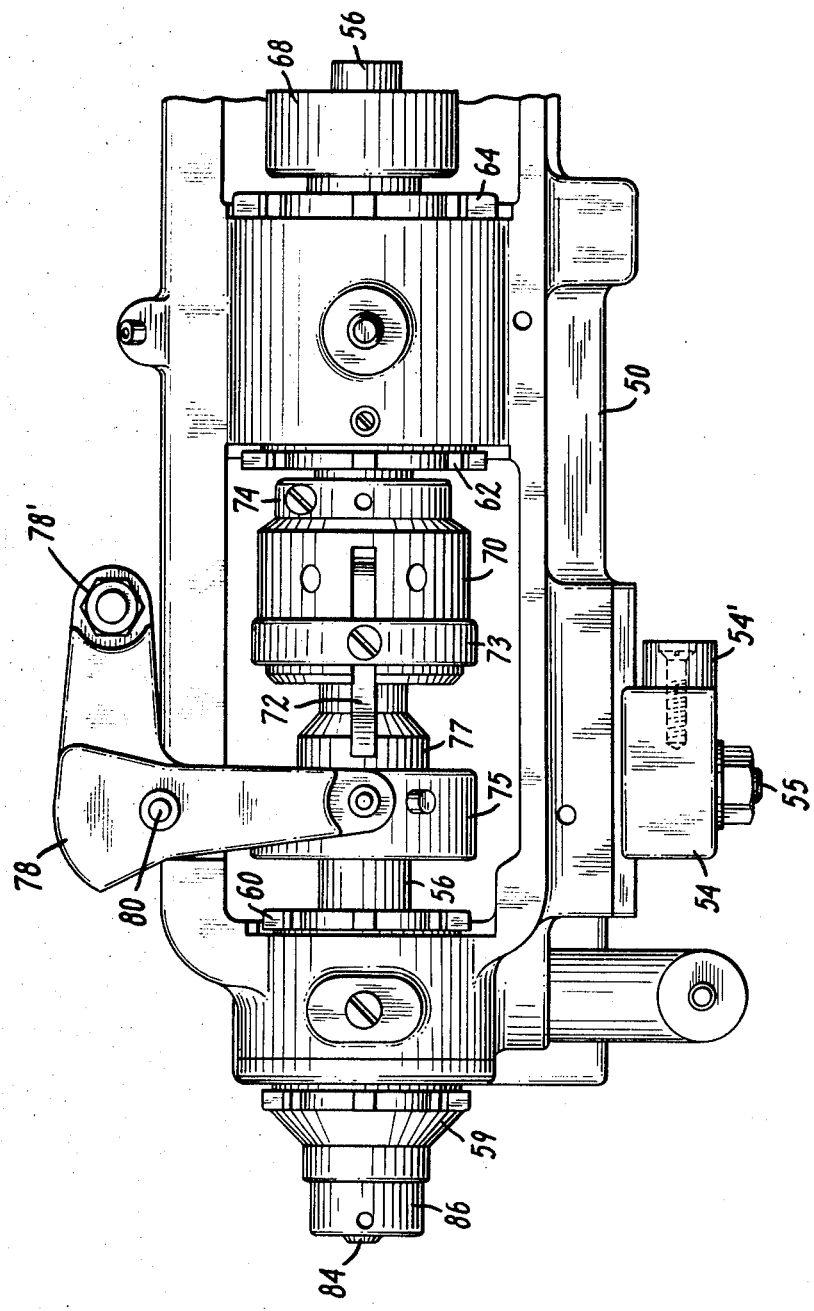
FIG. 6 is a plan view of the spindle shown in FIG. 4 with its cover removed.

In FIGS. 4, 5 and 6 there is shown a well-known construction of a work spindle of an automatic lathe including a head stock body 50 having a dovetailed lower portion 50' for slideable engagement with the upper surface of a machine base (not illustrated). A pin 51 is threaded into the front bottom surface of the head stock body 50, and a tension spring 52 is received at its one end on said pin 51 and is stretched parallel to the direction of slidable movement of the head stock body 50, while the other end of the spring 52 is also detained on a pin mounted on the machine base (not illustrated). Therefore, a constant retracting force urges the head stock rearwardly. On the other hand, a plate 54 is secured adjustably to the side surface of the head 50 by locking screws 55, and an abutment plate 54' is fixed on the rear-side face of said plate 54. A roller rotatably mounted on a cam lever (not illustrated) is engaged with said abutment plate 54' for slideably moving the head 50 to provide a specified stroke of the head against the retracting force of spring 52 through a suitable cam-lever mechanism (not illustrated). A head cover 53 is provided as shown in FIGS. 4 and 5, and this construction has been used in movable head stock automatic lathes or Swiss type automatic lathes.

Next, a work spindle 56 is rotatably supported by two bearings mounted respectively in the front and rear portions of said head stock 50. The said front bearing is comprised of a sleeve 57 having a tapered bore expanding forwardly and being force-fitted in the head 50, and a bearing bushing 58 having a tapered outer surface engaged with the said tapered bore. The bushing 58 and sleeve 57 are fixed together by adjusting nuts 59 and 60 screwed in threaded portions of both ends of said bushing 58 against the sleeve 57. The said rear bearing is comprised of two annular type ball bearings 61 having a face to face interrelation maintained by two-directional axial thrust forces fore and backwardly, wherein the outer race portions of said bearings 61 are tightened in fixed position by adjusting nuts 62 and 64 screwed in threaded portions of said head 50, to exert axial forces through rings 63 and 65, and the inner race portions are also tightened in fixed position by adjusting nut 67 threaded on the work spindle 56, and by a spacer ring 66 engaged against a shoulder of said spindle 56.

A flange 68 is secured by a key to the rear end of the work spindle 56 and has a hole therein for receiving a carrier (dog) 69 mounted on a driving shaft (not illustrated) for transferring rotational movement to the spindle which is thereby free of any effect of belt-tension.

This conventional mechanism of chuck opening and closing during spindle rotation operates as follows. The work spindle 56, having a hole 56' passed through its entire length along its axis line, is provided with two longitudinal grooves 56" in opposed position at the center portion thereof, between the front and rear bearings, and in which two swingable plate toggles 72 are inserted. Each toggle 72 has one rearwardly disposed short claw 72', and one forwardly disposed long claw 72". A toggle holder 70 is mounted on the spindle by a key (not illustrated) for axial adjustment by an adjusting nut 74 which is threadably received on the spindle 56. The toggle holder 70 has two grooves 70' corresponding to grooves 56" in which the main bodies of two said plate toggles 72 are seated and pivotally mounted on pins 71 securely set in the grooves 70' of the holder 70. Each long claw 72" of the toggles, as shown in FIG. 4, selectively abuts the outer face of an inner sliding sleeve 77, and a safety ring 73 is threaded on the outer face of said holder 70 to limit the degree of pivotal movement of toggles. The said inner sliding sleeve 77 is engaged slidably with the spindle and is formed with a tapered end face 77' at its rearward periphery. Also, this sleeve 77 has a groove for receiving steel balls 76 on its periphery, which balls are received in an opposed groove in a bore of an outer sliding sleeve 75. Thus, the inner sliding sleeve 77 rotates with rotation of the spindle, while the outer sliding sleeve 75 is prevented from rotation by pins 79 engaged with the upper and lower portions at the periphery of outer sleeve 75, said pins 70 being securely set in inside portions of a vertically forked chucking lever 78 which is pivoted on a pin 80 mounted vertically on the main body of the head 50. The chucking lever 78 is connected to a cam-mechanism (not illustrated) at the other end 78' thereof, and may be pivoted by the cam mechanism to cause sliding movement of the inner sleeve 77 so that the sleeve periphery abuts the long claws 72". Such abutment by the sleeve 77 causes movement of the toggles 72 to bring the short claws 72' in engagement with an inner sleeve 81 as described below. Forwardly of the grooves 56", the bore 56' is expanded in diameter for holding chuck operating parts therein. That is, a collet chuck 84 with a chuck sleeve 83 is inserted in the front end of bore 56' and is held by the inner bottom face of a cap nut 86 screw-connected to the periphery of the spindle 56. The collet chuck 84 has a conically formed outer face expanding forwardly which abuts the tapered bore 83' of the chucking sleeve 83, and a compression spring 85 is mounted contractively between the rear end of chuck 84 and a shoulder 83" formed in the bore of chuck sleeve 83. The periphery of said sleeve 83 engages slidably with the bore 56' and rotates with spindle 56 due to an engaging pin 87 secured on the spindle bore at a longitudinal groove machined on the sleeve 83.

A sleeve 82, together with the above-mentioned sleeve 81, are successively received in the spindle bore 56', and the rear end face of the rearward sleeve 81 is located in the long grooves 56" and is abutted to the short claws 72'.

Accordingly, by this known construction, when the long claws 72" of the toggle plates engage with the peripheral parallel portions of sliding sleeve 77 through swingable movement of the lever 78, the short claws 72' will axially press the end face of sleeve 81 and this pressure will be transmitted to the chucking sleeve 83 through sleeve 82, so that the collet chuck will be pressed at its conical face to the bottom face of cap nut 86, against the force of spring 85. As well known, the collet chuck 84 has a plurality of slits axially and equally divided on its front portion, so that it deforms itself elastically to make its inside-diameter narrower, thus grasping a bar stock received therein. Conversely, when the long claws 72" of toggle plates are brought to engage with the taper face 77' of sliding sleeve 77 through the forward movement of the lever 78, the short claws 72' will swing back by retracting power of the spring 85 through sleeves 83, 82, and 81, so that the pressure on the conical face of chuck 84 is released, and so that the elastic deformation of the chuck is recovered to expand its diameter, thereby releasing the bar stock. Therefore, this apparatus can be operated to open and close the chuck without stoppage of spindle rotation.

However, several disadvantages have been recognized in the above-mentioned conventional construction, especially at high speed rotation of the work spindle, due to the imbalance of rotating parts, so that a highly efficient operation cannot be expected. That is, the transmission line of chucking power is designed such as to transmit the power from lever 78 to the inner and outer sleeve 75 and 77 including steel balls 76, then to sleeves 81 and 82 through long and short claws 72" and 71' of the toggle plate, and finally to the chucking sleeve 83, so that the entire train of transmitting parts consist of solid members and lacks an elastic member which may act as a damper against excessive chucking power. Of course, in the case of changing the norminal dimension of bar stock and inserting a properly dimensioned chuck, the adjustment of chucking power can be performed to change the relative position between toggle holder 70 and work spindle 56 by turning the adjusting nut 74, but the fine adjustment of chucking power for compensating unavoidable size deviations due to manufacturing processes of stocks within a nominal size cannot be performed automatically. Therefore, if the diameter of bar stock deviates to the positive side, an abnormal chucking power is generated due to the lack of an elastic member in the transmitting line, and various distortions at every member might occur to induce large stresses by the abnormal power. Also, if the diameter of bar stock deviates to the negative side, the positioning of bar stock in the chuck may vary during machining due to an insufficient holding power, and thus cause defects in the resultant products.

The bottom face of cap nut 86, threadably received on the spindle noze for holding the collet chuck 84 therein, must be machined so as to have an outer face which is normal to the axis of the threads formed therein, but this machining process cannot be accomplished by a single operation with a single tool, so that it is very difficult to obtain products of good accuracy. Furthermore, even if the threads on the cap nut and spindle noze match each other accurately, it is extremely difficult to assemble the device so as to make the bottom face of the cap nut normal to the axis of the work spindle 56, thus giving rise to an un-equal peripheral holding power of chuck so that the bar stock is gripped eccentrically and deviates from the axis of the work spindle to produce a shaking rotation.

Thirdly, when the work spindle of these conventionally constructed devices operates at high-speed, the mass of rotating parts will become very large compared with the quill type spindle of this invention (described below), so that the amount of induced centrifugal force will increase progressively and the correction of an imbalance of such rotating parts including a long bar stock will be difficult, thus causing static and dynamic imbalances which may induce vibrations. The said imbalances, and the co-existing first and second defects, will produce temperature rises, abnormal wear and defective relations at the connecting portions of every power transmitting part so that a steady operation cannot be ensured. Especially, the deep-grooved ball bearing sleeve will generate severe pitching motions at the abutting points of the steel balls and sleeves due to vibration, and the appearance of rust or abnormal wear at these points will be induced by an electrocorrosional reaction which shortens the useful life of the parts.

As above mentioned, these conventional devices are unsuitable for high speed operation.

Figure 1:
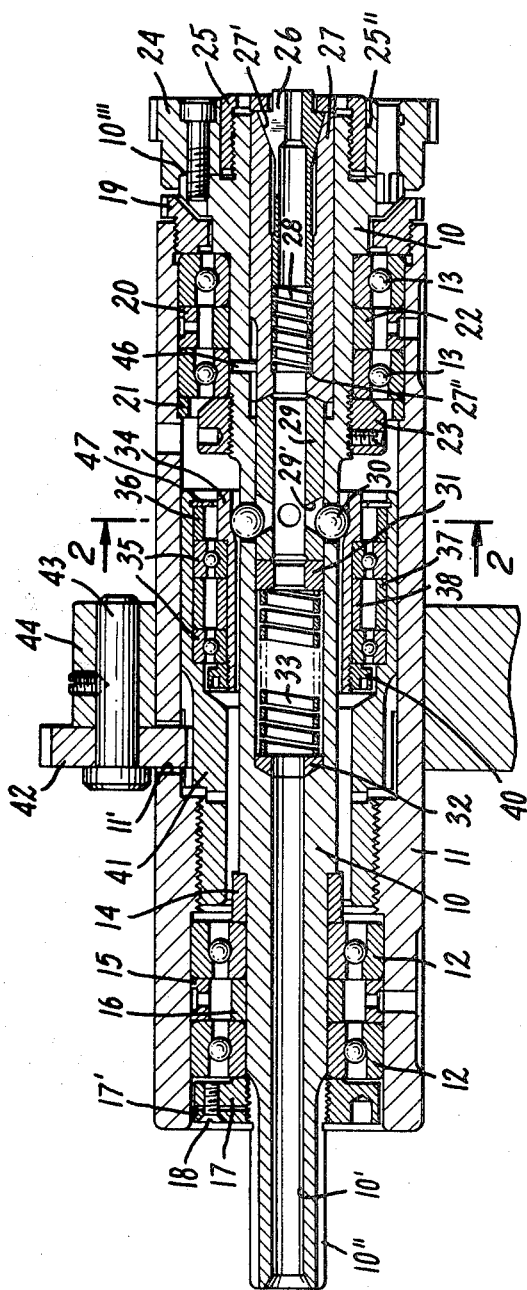
FIG. 1 is a longitudinal sectional view along the axis of a quill type spindle embodying the present invention.
Figure 3:
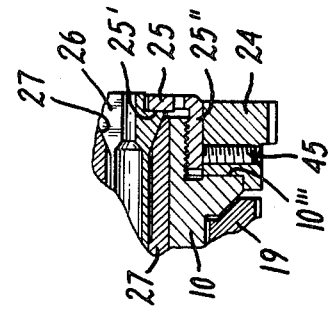
FIG. 3 is a fragmentary sectional view of the said spindle head of FIG. 1.
Figure 2:
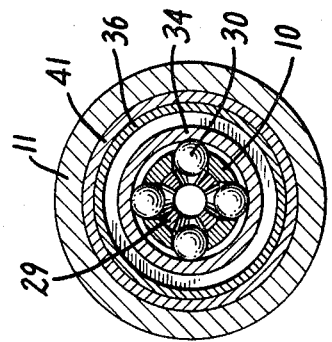
FIG. 2 is a sectional view taken on line II—II of FIG. 1.

The structure and function of the present invention, which eliminates the above-mentioned defects of the conventional structure, will be described with reference to FIGS. 1-3, wherein a spindle 10 is rotatably held in two bearings located in the front and rear portions of a quill 11. In detail, the rear bearing comprises two angular type ball bearings 12 disposed in a spaced combination, a spacer ring 15 nipped between the outer races of the bearings 12, spacer rings 14 and 16 nipped between a shoulder of spindle 10 and the outer side face of the inner race of the innermost bearing 12 and between the adjacent faces of the inner races respectively, and a lock nut 17 threadably connected to a peripheral thread of the spindle 10 for engaging the other face of the inner race on the outermost bearing 12. The said lock nut 17 has a locking mechanism which is tightened by a screw 18 across an axial slit thereof. The relative position of the rear bearing on the quill 11 can be altered slightly by sliding the bearing at its periphery in the bore of quill, so that the displacement of the spindle by operational heat may be released only toward the rearward direction, not forward, because the front bearing is fixed in its position to the spindle and quill as mentioned below. The front bearing comprises two angular type ball bearings 13 disposed in a spaced combination, spacer rings 21, 20 nipped between a shoulder formed in the bore of quill and the side face of the innermost outer race and between both outer races respectively, a lock nut 19 threadably connected in the bore of the quill to engage the outer race of the outermost race of the front bearing, a spacer ring 22 nipped between the inner races, and a lock nut 23 threadably connected on a peripheral thread of the spindle 10 and fixed against the inner race of the innermost bearing 13 at its innermost face. Therefore, the ball bearings 13 are tightened securely to the spindle and the quill at the inner and outer race portions thereof, so that the relative positions of the spindle and quill are firmly secured, and so that the front bearing may effectively support the bi-directional axial thrust forces due to the above-described assembly of the two bearings 13. Spline slots 10'' are machined and equally divided on the rear end periphery of spindle 10 for engagement with the output shaft of a high frequency motor (not illustrated) through a spline joint, so the motor may transfer rotation to the spindle regardless of the feed movement of the quill, but this invention is not to be limited to such a spline joint and other equivalent buffering joints may be used.

On the other hand, the size of the front portion of spindle 10 is increased in diameter and has a seat 10''' perpendicular to spindle axis against which is mounted a flange 24. The foremost front end of the spindle 10, beyond the seat 10''', carries a cap nut 25 which regulates the most advanced position of a collet chuck 26. The bottom face 25' of said cap nut 25 abuts a front side shoulder of the collet chuck 26 and is machined precisely perpendicular to the periphery 25'' thereof, and the screw-connection between the spindle 10 and the nut 25 produces a somewhat loose fit. The said periphery 25'' of the cap nut engages firmly and precisely with the bore of the flange 24 mounted on the spindle seat 10''' with an extremely small clearance, so that the cylindrical face of the bore of flange 24 is finished accurately parallel to the spindle axis, and the relative position of these members is secured in a desired relation by a set screw 45 mounted in the flange 24 as shown in FIG. 3. Accordingly, the chucking power transmitted to the work-piece through the chuck 26 is uniformly distributed about its periphery, and the chucked workpiece is automatically alinged with the spindle axis so that the correct chucking position is maintained perfectly from deleterious effects due to screw-connections.

A continuously extending spindle bore 10', along the spindle axis, is formed with a larger diameter at the front half portion thereof for receiving the chuck 26 and a chuck operating member. In detail, the collet chuck 26 abuts the bottom surface 25' of cap nut 25 at the front side shoulder thereof and is seated at the front end of said bore 10'. A chucking sleeve 27 abuts an outer peripheral conical surface 27' of chuck 26 at the tapered inner surface thereof, and a compression spring 28 is mounted contractively between an inner shoulder 27'' of chucking sleeve 27 and the rear end face of the chuck 26. Therefore, the spring force acts to release the chuck 26 by displacing the said sleeve rearwardly when a pushing force from the rear end face of sleeve 27 is removed as described below. The sleeve 27 is slidably engaged with the spindle bore 10' and rotates with the spindle 10 due to a pin 46 secured on the spindle and engaged within a longitudinal slot machined in the periphery of sleeve 27. Furthermore, a chuck operating sleeve 29 is also inserted in the spindle bore 10' to abut the rear end surface of sleeve 27 at its one end, and a compression spring 33 at its other end, wherein the spring 33 is mounted contractively between an inner shoulder of spindle bore 10' and the rear-end of said sleeve 29 through a pair of annular spring seats 31, 32 located respectively at opposed end of the spring 33. Therefore, the repulsing power of spring 33 may transmit the necessary chucking power to the chuck 26 by exerting a pushing force on the chucking sleeve 27, through the sleeve 29, and this repulsing power of spring 33 is designed to provide a sufficient chucking force by overcoming the force of spring 28. Furthermore, the strength of spring 33 maintains the chucking force within a constant range and prevents an abnormally high chucking force which would otherwise result from deviations of bar stock diameters. The chucking sleeve 27 and the chuck operating sleeve 29 along with the biasing spring comprise a slideable sleeve assembly.

Next, four taper-shaped through holes 29' expand outwardly through the chuck operating sleeve 29 and are equally divided on the central periphery thereof, while the spindle 10 is provided with radial openings alinged with the taper-shaped holes 29'. Then, four steel balls are received in the radial spindle openings and extend into the taper-shaped holes 29' for engaging the peripheral ends of the rear sides of the tapered hole 29' when the chuck is closed.

A chuck-actuating sleeve assembly comprises a sliding sleeve 34 rotatably supported by two ball bearings 35 located in a forward larger diameter portion of a chuck actuating sleeve 41 which is held slidably in the quill 11, and the said bearings 35 have inner-race portions disposed between a shoulder of sleeve 34 and a lock nut 40 threaded on the sleeve 34, and a spacer ring 38 disposed between said inner race portions. The bearings 35 are held at their outer race portions between shoulders on the inner periphery of actuating sleeve 41 and a snap ring 47, wherein two spacer rings 36 and 37 are disposed respectively between the outer races and between the forward outer race and the snap ring 47, so that sliding movements of the actuating sleeve 41 may be transmitted directly to the sliding sleeve 34. On the other hand, the inner peripheral surface of said sleeve 34 is formed larger in diameter at the front end thereof, and has a gradually tapered surface at its intermediate portion which joins the larger diameter portion with a smaller diameter portion of said inner periphery at the rear end of sleeve 34, so that the said sleeve 34 is rotatably supported but spaced from the spindle 10 except at four point contact points with the steel balls 30 due to a centrifugal foce induced by the spindle revolution. Accordingly, the rotation of sleeve 34 accompanies that of spindle 10 to assure smooth operation.

The said actuating sleeve 41 is slidably and rotatably engaged within the inner periphery of quill 11 and supported in a spaced relation from the periphery of spindle 10 at the inner periphery thereof, and is also screw-connected to threads formed on the inner-periphery of the quill near the rear bearing 12 of the spindle. Gear teeth are machined on the central outer periphery of sleeve 41 and are meshed with the gear teeth of a gear wheel 42 rotatably mounted on a shaft pin 43 secured on a block 44, which, in turn, is securely mounted on the periphery of quill 11. The gear wheel 42 extends through a window opening 11' for engaging the gear teeth on sleeve 41. Furthermore, the said gear wheel 42 may be reversibly rotated by a drive gear (not illustrated) meshed with said wheel and externally mounted, wherein the respective gear teeth are made sufficiently long so as not to be disengaged due to the feed movement of quill 11. Thus, in operation, the sleeve 41 may slide axially according to the pitch of the screw connecting portion thereof threadably connected to the quill, in accordance with the rotation thereof due to turning motion of the gear wheel 42. This sliding movement of sleeve 41 is directly transmitted to the sliding sleeve 34 so the abutted points of steel balls 30 on the inner periphery of sleeve 34 will move radially. When these abutted points of the balls 30 are moved from the larger diameter portion to the smaller diameter portion of the inner periphery of sleeve 34, the steel balls 30 are pushed further into the holes in the spindle 10, toward the center of spindle 10, and cause the spring 33 to contract by their centering movement along the rear side tapers of tapered holes 29', thus causing the sleeve 29 to move rearwardly. Accordingly, the transmission of the repulsing power of spring 33 to the chucking sleeve 27 is removed and the chuck 26 may be released by the other spring 28. The gear teeth formed at the front periphery of flange 24, as shown in FIGS. 1 and 3, are for taking off a synchronized rotation from the spindle 10 and do not concern to the gist of this invention.

When an exceptionally strong chucking power is required, the compression spring 33 may be removed from the construction as described above. In such case, the chucking sleeve 27 slides rearwardly due to the repulsing force of spring 28, and the chuck 26 is maintained in a normally open condition, while the operating sleeve 29 is also moved rearwardly at the same time, so that the front side tapered surfaces of hole 29' may be contracted at the periphery thereof with the steel balls 30. In this case, when the sliding sleeve 34 is slid forward by turning the gear wheel 42, and the steel balls 30 are pushed into the holes 29' along the front side tapers thereof toward the center of spindle 10, the chuck 26 may be provided with an unyieldable chucking power against the spring 28 through the chucking sleeve 27, and the tapered bore 27' thereof. That is,since there is no elastic member included in this transmission line, the total turning torque of gear wheel 42 can be transmitted to the chuck so that a positive and strong chucking function is assured.

The present invention being constituted and functioning as described above effectively eliminates three defects described with regard to the prior art. In particular, the first defect is eliminated in that the chucking power of the chuck 26 is generated only by the resultant repulsing force of the springs 28 and 33, so that no abnormal chucking force occurs due to a deviation from the normal diameter of the bar stock. The second defect is eliminated in that since the periphery and the bottom surface of the cap nut 25 are precisely machined to form an accurate right angle with each other, and the said periphery is also engaged firmly and precisely with the inner periphery of the flange 24 secured on the front end of spindle, the chucking position for bar stock can be controlled accurately regardless the screw-thread connection thereof, thereby restraining a shaking rotation of the bar stock. The third defect is eliminated in that the spindle of this invention is of the quill type, thus reducing the mass of rotating parts and providing a more compact and better balanced device as compared with the conventional structures, so that a steady, reliable, and extensive operation can be assured since the centrifugal force induced during high speed rotation of spindle is sufficiently small and the resistance to vibration is large. Another merit of the quill type design results from the ease with which the entire quill assembly can be replaced as one unit within a very short time when repair is required.

In summary, this invention provides novel advantages over the prior art, wherein the chucking and releasing of bar-stock held in the spindle can be performed firmly and effectively during high-speed rotation of the spindle and wherein such chucking is controllable by external means such as a gear wheel.

The present invention is not intended to be limited to the above-described embodiment since various modifications within the scope of the following claims will become apparent to those skilled in the art.

What is claimed is:

1. A quill spindle comprising a quill; a chuck-actuating sleeve assembly threadably connected to the inner periphery of said quill for rotative and axially slideable movement therein, said chuck-actuating sleeve assembly having a plurality of gear teeth disposed on its outer periphery, and said quill having a radial opening aligned with said gear teeth; a gear wheel extending through said quill opening and having gear teeth disposed in mesh with said gear teeth of said chuck-actuating sleeve assembly for actuation to rotate said sleeve assembly; a hollow spindle rotatably mounted within said quill and having an intermediate portion disposed coaxially within said chuck-actuating sleeve assembly; a slidable sleeve assembly received within said hollow spindle for axially slideable movement therewithin; a chuck disposed within said slideable sleeve assembly at a forward end of said spindle and including a forward opening for receiving a work-piece, said chuck including means for retainably engaging said work-piece received in said opening thereof in response to forward sliding movement of said slideable sleeve assembly and for releasing said work-piece upon rearward sliding movement of said slideable sleeve assembly; and means for slideably moving said slideable sleeve assembly in response to said axial movement of said chuck-actuating sleeve assembly.

2. A quill spindle as set forth in claim 1, in which said slideable sleeve assembly has a plurality of radially aligned and equally spaced radial openings in its outer periphery, wherein each said radial opening gradually decreases in cross-sectional area from said periphery, said spindle has a plurality of through openings radially aligned respectively with the slideable sleeve assembly openings, a plurality of rigid balls each disposed within respective ones of said radial openings in said spindle and extending radially inward into said slideable sleeve assembly openings and extending radially outward of the outer periphery of said spindle at the radial spindle openings, said chuck-actuacting sleeve assembly including an axially inclined inner peripheral surface radially aligned with said plurality of balls, and further comprising spring means engaging said slideable sleeve assembly for urging same in one axial direction within said spindle, whereby axial movement of said chuck-actuating sleeve assembly in a first direction forces said balls inwardly in response to engagement of said inclined inner peripheral surface of said chuck-actuating sleeve assembly with said balls thereby driving said balls further into said radial openings in said slideable sleeve assembly to move said slideable sleeve assembly axially against the force of said spring means.

3. A quill spindle as set forth in claim 2, in which said chuck actuating sleeve assembly comprises an outer sleeve having said gear teeth thereon, an inner sleeve disposed coaxially within said outer sleeve and having said inclined inner peripheral surface, and bearing means radially disposed between said inner and outer sleeves to permit relative rotation therebetween.

4. A quill spindle as set forth in claim 2, in which said slideable sleeve assembly includes a forward sleeve having said chuck disposed within a forward portion thereof, and a rearward sleeve axially aligned and releasably engaged with said forward sleeve and having said gradually decreasing radial openings therein, said spring means comprises a first coil spring compressively disposed for engagement at its respective ends against said forward sleeve and said chuck for urging said forward sleeve rearwardly, and a second coil spring compressively disposed for engagement at its respective ends against said rearward sleeve and said spindle for urging said rearward sleeve forwardly, whereby sliding movement of said rearward sleeve in response to inward movement of said balls produces a rearward movement of said rearward sleeve against the force of said second coil spring thereby allowing said forward sleeve to slide rearwardly under the force of said first coil spring to release said work-piece.

5. A quill spindle as set forth in claim 4, further comprising a cap nut threadably connected to said forward end of said spindle and having an internal bottom surface for providing a forward stop for said chuck, and means including a flange received on the forward end of said spindle and engageably encompassing said cap nut circumferentially for accurately aligning said cap nut bottom surface normal to the longitudinal axis of said chuck.

6. A quill spindle as set forth in claim 1, further comprising a cap nut threadably connected to said forward end of said spindle and having an internal bottom surface for providing a forward stop for said chuck, and means including a flange received on the forward end of said spindle and engageably encompassing said cap nut circumferentially for accurately aligning said cap nut bottom surface normal to the longitudinal axis of said chuck.

7. A quill spindle comprising a quill; a chuck-actuating sleeve assembly disposed within said quill for axially slideable movement therein; means mounted externally of said quill and connected to said chuck-actuating sleeve assembly for effecting said sliding movement of said sleeve assembly; a hollow spindle rotatably mounted within said quill and having an intermediate portion disposed coaxially within said chuck-actuating sleeve assembly; a slidable sleeve assembly received within said hollow spindle for axially slideable movement therewithin; a chuck disposed within said slideable sleeve assembly at a forward end of said spindle and including a forward opening for receiving a work-piece, said chuck including means for retainably engaging said work-piece received in said opening thereof in response to forward sliding movement of said slideable sleeve assembly and for releasing said work-piece upon rearward sliding movement of said slideable sleeve assembly; and means for slideably moving said slideable sleeve assembly in response to said axial movement of said chuck-actuating sleeve assembly including a plurality of radially aligned and equally spaced radial openings in the outer periphery of said slideable sleeve assembly, wherein each said radial opening gradually decreases in cross-sectional area from said periphery, said spindle has a plurality of through openings radially aligned respectively with the slideable sleeve assembly openings, a plurality of rigid balls received within said radial openings in said spindle and extending radially inward into said slideable sleeve assembly openings and extending radially outward of the outer periphery of said spindle at the radial spindle openings, said chuck-actuating sleeve assembly including an axially inclined inner perpheral surface radially aligned with said plurality of balls, and spring means engaging said slideable sleeve assembly for urging same in one axial direction within said spindle, whereby axial movement of said chuck-actuating sleeve assembly in a first direction forces said balls inwardly in response to engagement of said inclined inner periphery of said chuck-actuating sleeve assembly with said balls thereby driving said balls further into said radial openings in said slideable sleeve assembly to move said slideable sleeve assembly axially against the force of said spring means.

8. A quill spindle as set forth in claim 7, in which said slideable sleeve assembly includes a forward sleeve having said chuck disposed within a forward portion thereof, and a rearward sleeve axially aligned and releasably engaged with said forward sleeve and having said gradually decreasing radial openings therein, said spring means comprises a first coil spring compressively disposed for engagement at its respective ends against said forward sleeve and said chuck for urging said forward sleeve rearwardly, and a second coil spring compressively disposed for engagement at its respective ends against said rearward sleeve and said spindle for urging said rearward sleeve forwardly, whereby sliding movement of said rearward sleeve in response to inward movement of said balls produces a rearward movement of said rearward sleeve against the force of said second coil spring thereby allowing said forward sleeve to slide rearwardly under the force of said first coil spring to release said work-piece.

9. A quill spindle as set forth in claim 8, further comprising a cap nut threadably connected to said forward end of said spinle and having an internal bottom surface for providing a forward stop for said chuck, and means including a flange received on the forward end of said spindle and engageably encompassing said cap nut circumferentially for accurately aligning said cap nut bottom surface normal to the longitudinal axis of said chuck.

10. A quill spindle as set forth in claim 7, further comprising a cap nut threadably connected to said forward end of said spindle and having an internal bottom surface for providing a forward stop for said chuck, and means including a flange received on the forward end of said spindle and engageably encompassing said cap nut circumferentially for accurately aligning said cap nut bottom surface normal to the longitudinal axis of said chuck.

11. A quill spindle as set forth in claim 7, in which said chuck actuating sleeve assembly comprises an outer sleeve connected to said externally mounted moving means, an inner sleeve disposed coaxially withinsaid outer sleeve and having said inclined inner peripheral surface, and bearing means radially disposed between said inner and outer sleeves to permit relative rotation therebetween.

12. A quill spindle comprising a quill; a chuck-actuating sleeve assembly disposed within said quill for axially slideable movement therein; means mounted externally of said quill and connected to said chuck-actuating sleeve assembly for effecting said sliding movement of said sleeve assembly; a hollow spindle rotatably mounted within said quill and having an intermediate portion disposed coaxially within said chuck-actuating sleeve assembly; a slideable sleeve assembly received within said hollow spindle for axially slideable movement therein; a chuck disposed within said slideable sleeve assembly at a forward end of said spindle and including a forward opening for receiving a work-piece, said chuck including means for retainably engaging said work-piece received in said opening thereof in response to forward sliding movement of said slideable sleeve assembly and for releasing said work-piece upon rearward sliding movement of said slideably sleeve assembly; coupling means for slideably moving said slideable sleeve assembly in response to said axial move ment of said chuck-actuating sleeve assembly; and wherein said slideable sleeve assembly includes a forward sleeve having said chuck disposed within a forward portion thereof, and a rearward sleeve axially aligned and releasably engaged with said forward sleeve and engaged with said coupling means, spring means comprising a first coil spring compressively disposed for engagement in its respective ends against said forward sleeve and said chuck for urging said forward sleeve rearwardly, and a second coil spring compressively disposed for engagement at its respective ends against said rearward sleeve and said spindle for urging said rearward sleeve forwardly whereby sliding movement of said rearward sleeve in response to said coupling means produces a rearward movement of said rearward sleeve against the force of said second coil spring thereby allowing said forward sleeve to slide rearwardly under the force of said first coil spring to release said work-piece.

13. A quill spindle as set forth in claim 12, further comprising a cap nut threadably connected to said forward end of said spindle and having an internal bottom surface for providing a forward stop for said chuck, and means including a flange received on the forward end of said spindle and engageably encompassing said cap nut circumferentially for accurately aligning said cap nut bottom surface normal to the longitudinal axis of said chuck.

* * * * *